US 8,027,475 B2

(12) United States Patent
McTeer et al.

(10) Patent No.: US 8,027,475 B2
(45) Date of Patent: Sep. 27, 2011

(54) METHODS AND MEDIA FOR RECOVERING LOST ENCRYPTION KEYS

(75) Inventors: Elizabeth A. McTeer, Austin, TX (US); Peter Tabur, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 593 days.

(21) Appl. No.: 12/165,638

(22) Filed: Jun. 30, 2008

(65) Prior Publication Data

US 2009/0323963 A1     Dec. 31, 2009

(51) Int. Cl.
*H04L 9/00* (2006.01)
(52) U.S. Cl. .......................... 380/277; 726/26
(58) Field of Classification Search ................... 380/277; 707/674–675, 680, 696; 714/6.2, 6.21; 369/30.01, 369/30.06, 30.4–63; 726/26
See application file for complete search history.

(56) References Cited

U.S. PATENT DOCUMENTS

| | | | |
|---|---|---|---|
| 4,897,875 A | 1/1990 | Pollard et al. | |
| 5,870,732 A * | 2/1999 | Fisher et al. | 1/1 |
| 6,169,803 B1 * | 1/2001 | Sako et al. | 380/44 |
| 6,460,137 B1 | 10/2002 | Akiyama et al. | |
| 6,729,825 B1 * | 5/2004 | Saliba et al. | 414/280 |
| 6,854,034 B1 * | 2/2005 | Murakami et al. | 711/112 |
| 6,917,993 B2 * | 7/2005 | Johnson et al. | 710/74 |
| 7,146,485 B1 * | 12/2006 | Selkirk et al. | 711/206 |
| 7,266,699 B2 | 9/2007 | Newman et al. | |
| 7,277,941 B2 * | 10/2007 | Ignatius et al. | 709/225 |
| 2004/0196759 A1 * | 10/2004 | Ishibashi et al. | 369/47.19 |
| 2005/0174869 A1 * | 8/2005 | Kottomtharayil et al. | 365/222 |
| 2007/0226535 A1 * | 9/2007 | Gokhale | 714/6 |
| 2008/0061138 A1 * | 3/2008 | Fisher et al. | 235/382 |
| 2008/0065882 A1 * | 3/2008 | Goodman et al. | 713/165 |
| 2008/0147892 A1 * | 6/2008 | Carlson et al. | 710/5 |
| 2009/0028336 A1 * | 1/2009 | Goodman et al. | 380/277 |
| 2010/0031000 A1 * | 2/2010 | Flynn et al. | 711/216 |

* cited by examiner

*Primary Examiner* — Philip Chea
*Assistant Examiner* — Eric W Shepperd
(74) *Attorney, Agent, or Firm* — Garrana Tran LLP; Andrea E. Tran

(57) ABSTRACT

An information handing system provides a method for recovering encryption keys. The method includes providing a first recording medium of a plurality of recording media in a first drive of a plurality of drives. A first key is requested from a primary key manager (PKM) associated with the first drive, wherein the first drive provides a first key identifier (ID) to the PKM. If it is determined that the PKM provides the first key corresponding to the first key ID, a first identifying information for the PKM is stored in a memory for the first recording medium.

15 Claims, 3 Drawing Sheets

METHODS AND MEDIA FOR RECOVERING LOST ENCRYPTION KEYS

BACKGROUND

1. Technical Field

The present disclosure relates generally to the field of information handling systems. More specifically, but with limitation, the disclosure relates to recovering lost encryption keys.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an IHS is a computer data storage system, such as a tape library, a redundant array of independent disk (RAID), or just a bunch of disk (JBOD). A storage system may include several recording media, which may be utilized to store encrypted data. For instance, a tape library may provide several tape cartridges, at least one tape drive, and a mechanism for loading/unloading cartridges from the tape drive(s). A tape library may be capable of storing a significant amount of data, which may also be encrypted by a capable tape library. In a tape library, data may be encrypted utilizing a key manager (KM) that issues encryption/decryption keys, with the KM residing on a server or in the tape library, Some tape libraries may be associated with primary key managers (PKM) along with secondary or backup key managers (SKM). Additionally, some tape libraries may be partitioned in accordance with the number of tape drives in the library. For instance, a tape library with 18 tape drives could have 18 partitions. A pair of key managers (i.e., a PKM and corresponding SKM) may be utilized for each tape drive in the library to manage encryption/decryption keys utilized for the data stored or data to be stored. Accordingly, a tape library may be associated with 18 PKMs and 18 SKMs (i.e., one key pair per partition). The use of KMs for each partition may pose a potential risk to users in the event that partition information is lost. Should there be a loss in partition information, it may cause the subsequent loss of information indicating the particular KM associated with the tape, thus the encrypted media may be unreadable until it is properly associated with its corresponding KM.

Similarly, other types of data storage systems may encounter a similar problem. If the information indicating an association between a particular KM and recording media in a data storage system is lost, the data encrypted on the recording media may be unrecoverable until the information indicating the association is recovered. If KMs are utilized for media drives in large data storage systems which comprise hundreds of media drives and thousands of recording media, it could take a significant amount of time to manually determine which KMs are associated with each of the recording media in the data storage system.

Thus, a need exists for methods and media for automating an encryption key process which may identify a particular pair of key managers utilized to encrypt each of the recording media in a tape library.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for recovering encryption keys for an information handing system. The method includes providing a first recording medium of a plurality of recording media in a first drive of a plurality of drives. A first key is requested from a primary key manager (PKM) associated with the first drive, wherein the first drive provides a first key identifier (ID) to the PKM. If it is determined that the PKM provides the first key corresponding to the first key ID, a first identifying information for the PKM is stored in a memory for the first recording medium.

Another aspect of the disclosure provides a computer-readable medium having computer-executable instructions for performing a method for recovering encryption keys for an information handing system. The method includes providing a first recording medium of a plurality of recording media in a first drive of a plurality of drives. A first key is requested from a primary key manager (PKM) associated with the first drive, wherein the first drive provides a first key identifier (ID) to the PKM. If it is determined that the PKM provides the first key corresponding to the first key ID, a first identifying information for the PKM is stored in a memory for the first recording medium.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus, systems and methods are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a device" refers to one or several devices, and reference to "a method of processing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
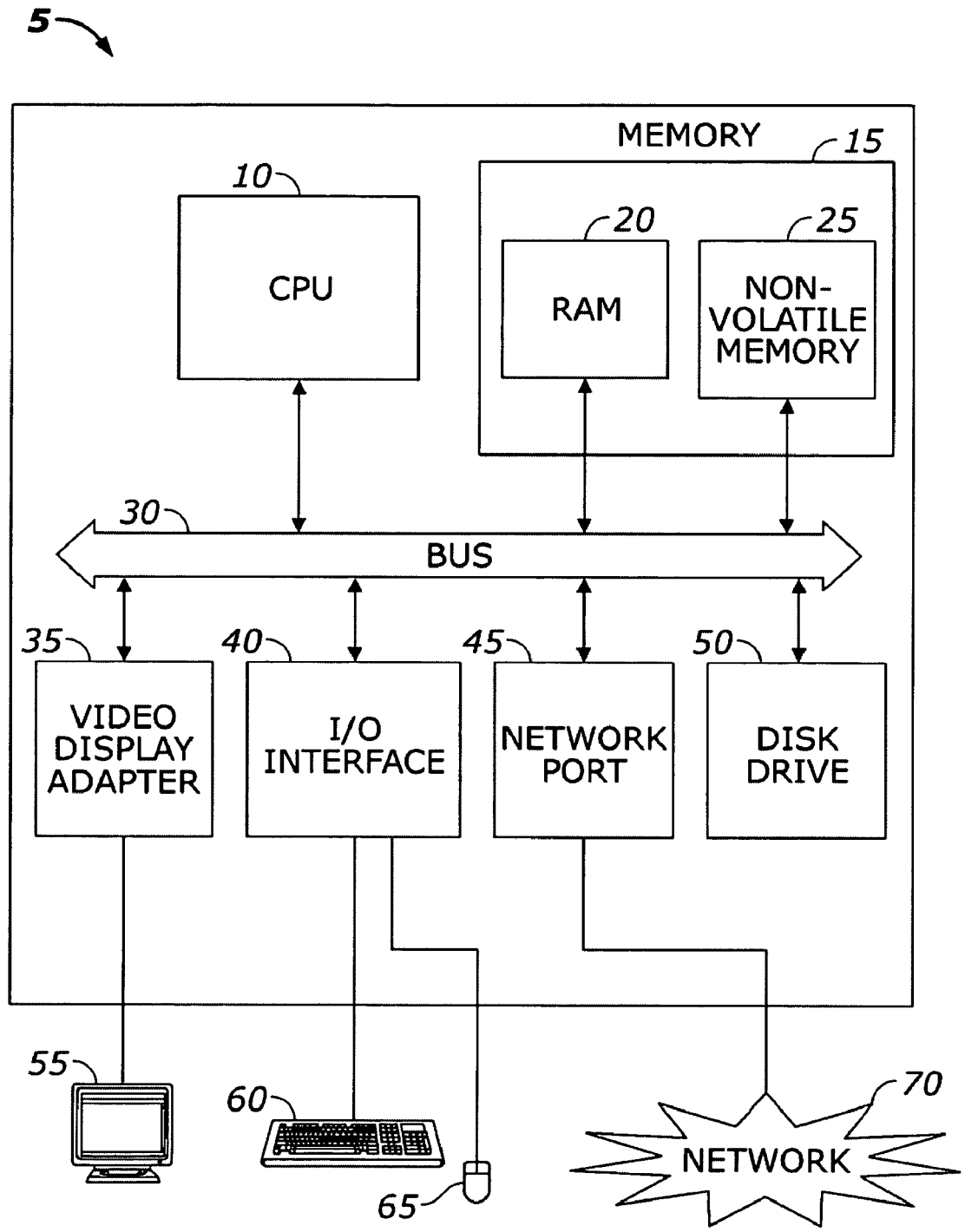
FIG. 1 represents an illustrative schematic of an information handling system (IHS) in accord with the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
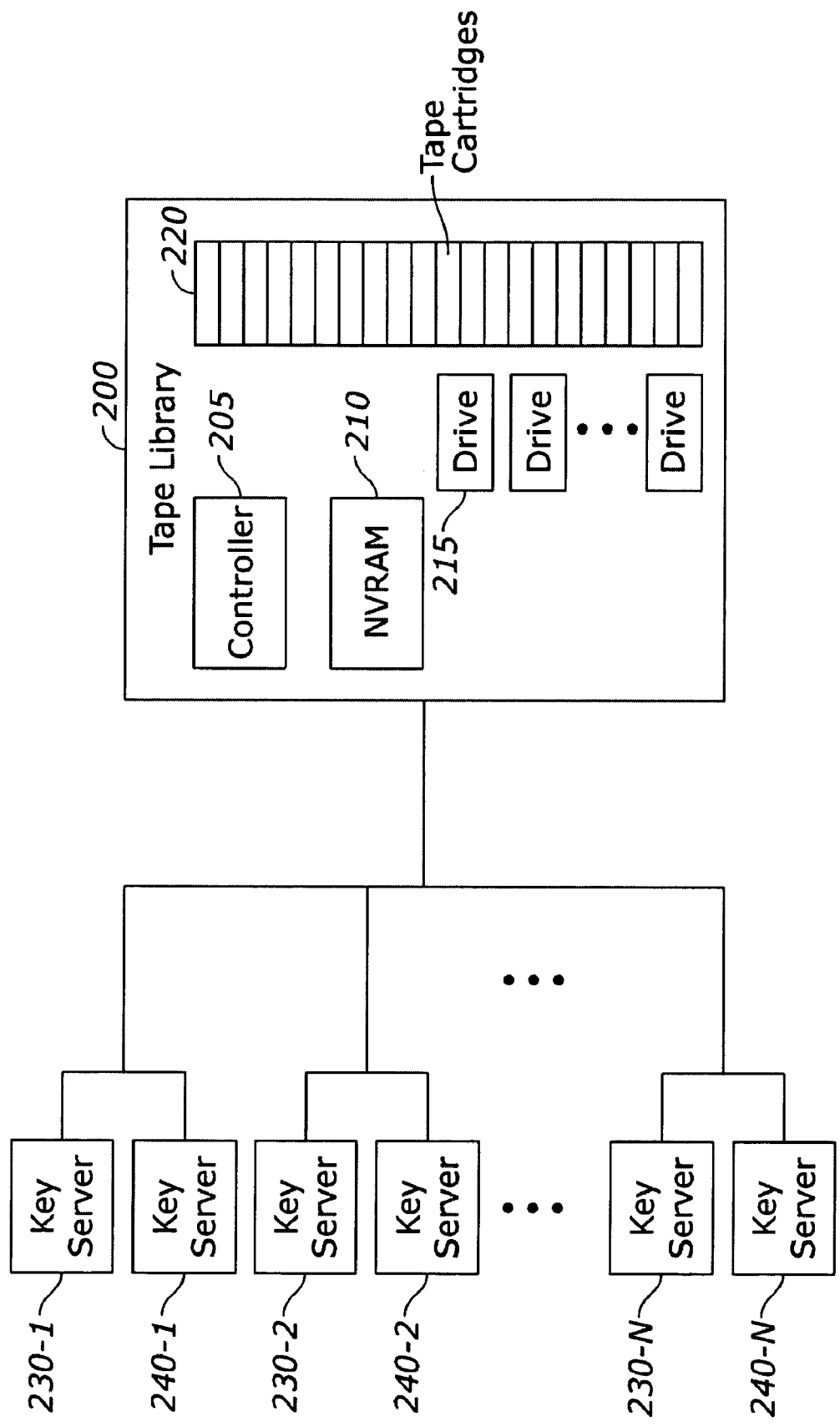
FIG. 2 represents an illustrative implementation of an IHS utilized for mass data storage.

FIG. 2 provides an illustrative implementation of an IHS utilized for mass data storage, such as a tape library indicated generally at 200. A tape library 200 may provide storage shelves or slots for multiple tape cartridges or cassettes 220. Each of the tape cartridges 220 may utilize a reel of magnetic tape to store data. One or more tape drives 215 may read and write data from/to the cartridges 220. A mechanical mechanism, such as a robot, may be utilized to retrieve a cartridge 220 from the storage shelves and to place it into or remove it from one of the tape drives 215. Each of the tape cartridges 220 may have tape identification (ID) information provided by an attached radio frequency identification (RFID) tag, barcode, non-volatile memory, or any other suitable information providing tool, which may be utilized to identify the tape cartridge 220. The tape library 200 may also include a controller 205, such as a processor or microprocessor, to manage the operation of the tape library 200. For instance, the controller 205 may direct a robot to retrieve or return cartridges 220 from the shelves, control tape drives to perform read/write operations, perform encryption/decryption, and manage various other operations in the tape library. A non-volatile memory (NVM) 210 may store system information, firmware, applications, partition information, inventory information, and additional data utilized to operate the tape library 200.

Data stored on a tape library 200 may be encrypted to protect against unauthorized access. In one implementation of an encryption process, one or more key managers (KMs), such as a primary key server (PKM) 230 and secondary or backup key manager (SKM) 240, may be coupled to the tape library 200. Key managers 230-1 to 230-N may provide encryption and decryption keys to the tape library 200, which can be utilized to encrypt/decrypt data recorded or read from a tape cartridge 220. The KMs 230 may manage and generate several encryption/decryption keys in a keystore and provide the keys to authorized devices when requested. A keystore may be a storage location utilized to store several encryption/decryption keys. Each encryption/decryption key may have an associated key identifier that is provided by a KM to a tape drive 215. The key identifier may be inserted into the header of data to be written to a cartridge 220 to indicate the particular key used to encrypt the data. When the tape library wants to read data from a cartridge 220, the key identifier may be provided to a PKM 230 to retrieve a corresponding decryption key. Further, the tape drives 215 may to need provide an authentication identifier (ID) to the PKM 230 before the PKM 230 provides the decryption key. An authentication ID may indicate which device is requesting a key and may be utilized to verify that the device has permission to receive a key. Once the authentication ID is validated and the decryption key is provided, the tape drives 215 may read and decrypt the data from the cartridge 220. In some implementations, several SKMs 240 associated with the PKMs 230 may also be provided in a tape library to backup the encryption and decryption keys. A SKM 240 may provide a backup key manager for a PKM 230 that may be utilized if the PKM 230 is damaged or unavailable. A PKM 230-1, 230-2, or 230-N and a corresponding SKM 240-1, 240-2, or 240-N may be referred to as a key server pair. Several key server pairs may be utilized by a tape library 200 to manage the keys utilized to encrypt and decrypt data. For instance, a different key server pair may be utilized for each drive 215 or partition in a tape library 200. While the PKMs 230 and SKMs 240 may be on remotely located servers as shown, in another implementation of a tape library 200, KMs may be provided locally within a tape library 200. Further, encryption and decryption may be performed utilizing hardware based tools, software based tools, or a combination of both.

As discussed previously, if data stored in a NVM 210 of the tape library 200 is lost or damaged, which may cause the tape library 200 to lose information utilized to locate a key for a particular cartridge 220, the key server pair and cartridges 220 associated with a partition may need to be manually determined. For instance, when information stored in a NVM 210 is corrupted or damaged, a user may cycle through each cartridge 220 in a tape library 200 and ask each PKM 230 and/or SKM 240 whether a key corresponding to a key identifier on the cartridge 220 is provided by the PKM 230 or SKM 240. When a key is located, the user may re-associate the tape cartridge 220 with a PKM 230 and/or SKM 240 providing the decryption key. However, because there may be numerous cartridges 220 and several key server pairs in a tape library 200, the process could take a significant amount of time for the user to complete.

While the automated encryption key recovery process discussed herein may utilize a tape library to illustrate the process, the recovery process is in no way limited to a tape library. Encryption and decryption may be utilized with various types of recording media, and similar problems may arise for storage systems utilizing multiple recording media. The recovery process discussed herein may be utilized to recover keys for a storage system utilizing any type of recording media, such as tape cartridges or cassettes, magnetic disks, optical disks, memory cards, or the like. Recovery software automating the process of determining a recording medium associated with a key manager and a particular partition may be installed in a memory provided by a storage system. Encryption key recovery software installed in the storage system may cause the storage system to automatically cycle through the recording media to determine the key manager and partition associated with each recording medium when a recovery process is initiated. By automating the recovery process, a user may not need to manually cycle through the recording media in the storage system and recovery time may be reduced. Thus, the automated recovery process may reduce the lengthy recovery time and eliminate the need for an administrator to manually cycle through the recording media during recovery.

Figure 3:
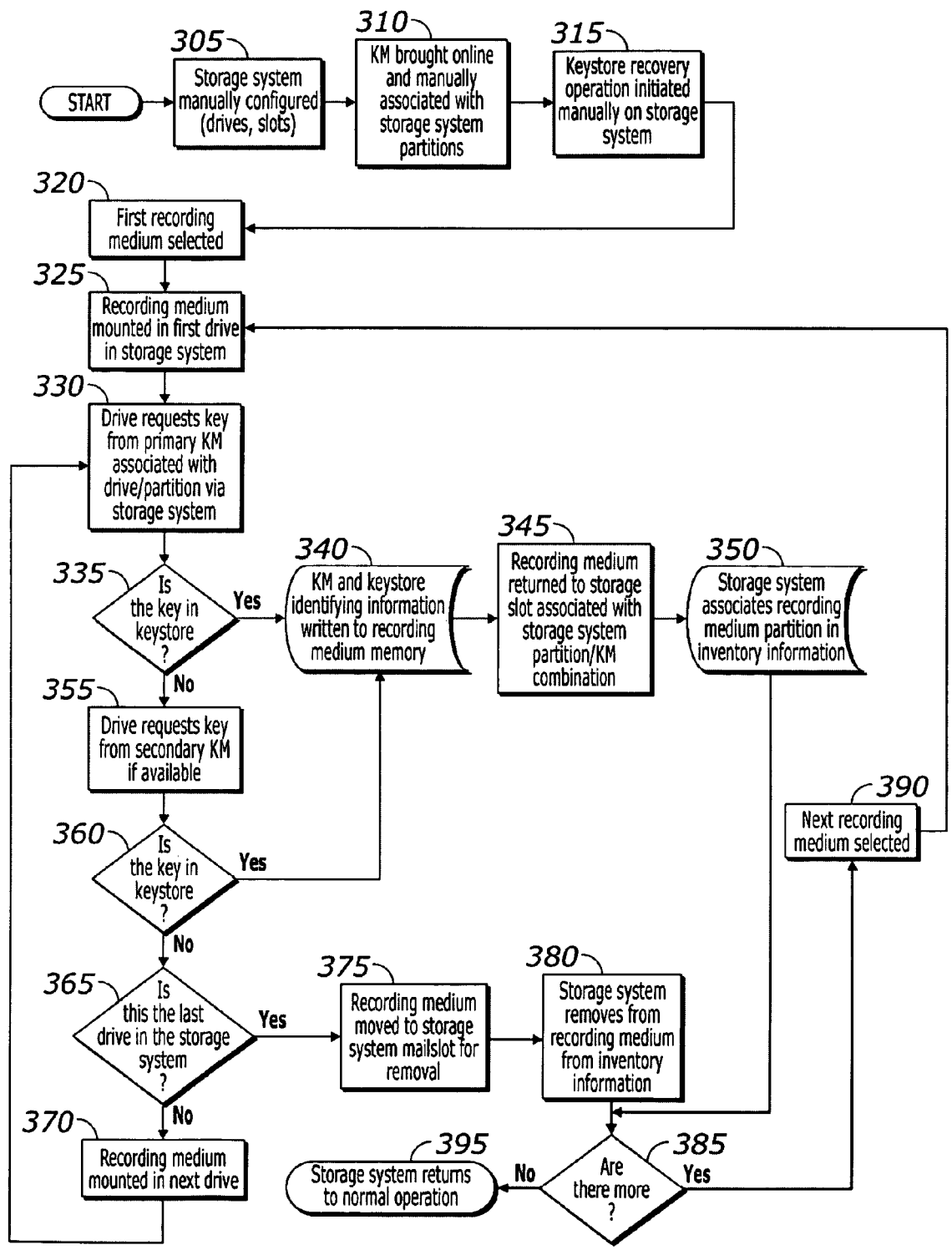
FIG. 3 represents an illustrative implementation of an automated encryption key recovery process.

FIG. 3 provides an illustrative implementation of an automated encryption key recovery process. When partition information for a storage system is lost or damaged, an automated encryption key recovery process may simplify the process of recovering encryption keys as compared to a manual recovery process. In step 305, partitions may be manually configured by a user. Since the partition information stored by a memory (e.g., NVM 210) in the storage system is no longer available, the original partition information may not be capable of being recovered. As a result, the storage system may be partitioned by a user in the same manner it was partitioned prior to losing the information, if known, or in a newly desired manner. For instance, if the storage system originally provided a partition for each drive in the storage system, a user familiar with the original partition scheme may manually create a partition for each drive. Next, several PKM and SKM may be brought back online and associated with the created partitions in step 310. These first two steps may be part of the physical reconstruction of the tape library which may require a user to manually operate the storage system. Once these steps have been performed, a recovery operation may be initiated on the tape library in step 315. For instance, the storage system may include a button that may be pressed to start the recovery operation.

The remaining steps in the recovery process may be automated by software contained in a memory of the storage system. The automated process may begin in step 320 when the storage system selects a first recording medium that may be mounted in a first drive in the storage system in step 325. Once the recording medium is mounted in a drive, the drive may request a key from a PKM associated with the drive/partition in step 330. For example, a key identifier may be read from the recording medium mounted in the drive and provided to a PKM to request a key corresponding to the key identifier. In one implementation, the drive may also provide authorization data to the PKM to ensure that the storage system is authorized to receive keys from the PKM. In step 335, a PKM may determine if an encryption key corresponding to the key identifier provided by the recording medium is provided by the keystore of the PKM.

If the encryption key is provided by the PKM, key manager and keystore identifying information may be written to a memory attached to the recording medium, such as the cartridge's cassette memory (CM) in step 340. The key manager and keystore identifying information may indicate the particular KM and keystore containing the encryption key for the recording medium. In another implementation of the recovery process, the KM and keystore identifying information may be written in a portion of the recording medium. For instance, a redundant array of independent disks (RAID) may not include a separate memory attached to each disk, and, as a result, the identifying information may be written to a portion of the disk. Next, the recording medium may be returned to a storage slot associated with the partition and KM combination in step 345. The storage system may also associate the recording medium with the partition in the inventory information stored in a NVM of the storage system in step 350. The inventory information may include information regarding the inventory of recording media and partitions, the association between a recording medium and a partition, the physical address of the recording media, and any other suitable data for a storage system.

If the encryption key is not provided by the PKM, the drive may request the key from a corresponding SKM in step 355. The SKM may determine if the encryption key is provided by the keystore of the SKM in step 360. If the SKM provides the encryption key, then steps 340-350 may be performed as discussed previously. In some implementations of a recovery process, a SKM may not be utilized by a storage system and the steps relating to a SKM may be omitted. If the SKM does not provide the encryption key, the storage system may determine if the drive is the last drive in step 365. If the drive is not the last drive in the storage system, then the recording medium may be mounted in the next drive in step 370. Once the recording medium is mounted in the next drive the process may return to step 330. By returning to step 330, the recovery process may mount the recording medium in each drive in the storage system and check if the key managers associated with each drive provide the encryption key. This may allow the storage system to check each key manager in the system for a key utilized to decrypt the data stored on a recording medium. A mailslot may allow recording media to be removed from the storage system. If the recovery process reaches the last drive in the storage system, then none of the key managers currently provide the encryption/decryption key online. Thus, the recording medium may be moved to a storage medium mailslot for removal in step 375. The recording medium may also be removed from the inventory information for the storage system provided in a NVM in step 380. Such a situation may occur when one of the key managers has been damaged and cannot be brought back online in step 310.

Regardless of whether the recording medium is removed from the storage system in step 380 or placed back into a storage slot in step 350, the storage system may check if there are additional recording media in step 385. If there are no additional recording media, the recovery process has re-associated each recording medium in the storage system with a corresponding partition and key manager or removed the recording media for which the keys could not be recovered. Consequently, the storage system may return to normal operation in step 395. If there are additional recording media, the next recording medium may be selected in step 390. The next recording medium may be mounted in the first drive in step 325 and the steps may be repeated for the newly mounted recording medium. The automated recovery process may repeatedly cycle through the steps for each recording media in the storage system. By automating steps 320-395, the recovery process may be simplified to a one button operation that allows encryption keys to be easily recovered without a user spending a significant amount of time to manually locate keys for each recording medium in the storage system.

Various methods are contemplated including all or less than all of the steps described herein and/or mentioned above, any number of repeats or any of the steps shown and/or mentioned above, and performance of the steps in any order.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for recovering encryption keys for an information handing system ("IHS") data storage media library having a plurality of drives and managed encryption, by restoring the association of storage media with a key server, the method comprising:
    (a) mounting a first recording medium of a plurality of recording media in a first drive of a plurality of drives;
    (b) automatically requesting a first key from a primary key manager (PKM) associated with the first drive, wherein the first drive provides a first key identifier (ID) to the PKM;
    (c) determining if the PKM associated with the first drive provides the first key corresponding to the first key ID;
    (d) mounting the first recording medium of a plurality of recording media in a next drive of the plurality of drives if the PKM does not provide the first key corresponding to the first key ID;
    (e) automatically requesting a first key from a primary key manager (PKM) associated with the next drive, wherein the next drive provides the first key identifier (ID) to the PKM associated with the next drive; and
    (f) determining if the PKM associated with the next drive then provides the first key corresponding to the first key ID;
    (g) repeating steps (d) through (f) for succeeding drives of the plurality of drives if the PKM associated with the next drive does not provide the first key corresponding to the first key ID; and
    (h) storing a first identifying information for a PKM associated with a specific drive in a memory for the first recording medium when the PKM associated with the specific drive provides the first key.

2. The method of claim 1, wherein a PKM manages a plurality of keys utilized to encrypt and decrypt the plurality of recording media, and each of the plurality of keys is associated with each of a plurality of key IDs.

3. The method of claim 1, wherein the plurality of recording media are selected from a group consisting of magnetic tape cartridges, magnetic disk, optical disk, and memory cards.

4. The method of claim 1, wherein when a PKM associated with a specific drive provides the first key, the first recording medium is associated with a first partition in an inventory information and the first recording medium is returned to a storage slot associated with the first partition and the PKM associated with the specific drive.

5. The method of claim 1, wherein steps (a)-(h) are repeated for each of the plurality of recording media in the IHS.

6. The method of claim 1, further comprising:
    (k) requesting the first key from a secondary key manager (SKM) associated with the first drive if the PKM associated with the first drive does not provide the first key, wherein the first drive provides the first key ID to the SKM;
    (l) determining if the SKM provides the first key corresponding to the first key ID; and
    (m) storing a second identifying information for the SKM to the memory for the first recording medium if the SKM provides the first key.

7. The method of claim 6 further comprising:
    (n) moving the first recording medium to a mailslot for removal from the IHS if none of the plurality of PKMs and the plurality of SKMs provide the first key corresponding to the first key ID; and
    (o) removing the first recording medium from an inventory information for the IHS.

8. The method of claim 7, wherein steps (a)-(o) are repeated for each of the plurality of recording media in the IHS, and the steps (a)-(o) are automated by the IHS.

9. A method for recovering encryption keys for managed tape libraries of an information handing system ("IHS") by restoring the association of storage media with a corresponding key server, the method comprising:
    (a) providing a first of a plurality of tape recording media in a first of a plurality of tape drives;
    (b) automatically requesting a first key from a primary key manager (PKM) associated with the first tape drive, wherein the first tape drive provides a first key identifier (ID) to the PKM;
    (c) determining if the PKM associated with the first tape drive provides the first key corresponding to the first key ID;
    (d) mounting the first tape recording medium of a plurality of tape recording media in a next tape drive of the plurality of tape drives if the PKM does not provide the first key corresponding to the first key ID;

(e) automatically requesting a first key from a primary key manager (PKM) associated with the next tape drive, wherein the next tape drive provides the first key identifier (ID) to the PKM associated with the next tape drive; and (f) determining if the PKM associated with the next tape drive then provides the first key corresponding to the first key ID;

(g) repeating steps (d) through (f) for succeeding tape drives of the plurality of tape drives if the PKM associated with the next tape drive does not provide the first key corresponding to the first key ID; and (h) storing a first identifying information for a PKM associated with a specific tape drive in a memory for the first tape recording medium when the PKM associated with the specific drive provides the first key.

10. The method of claim 9, wherein a PKM manages a plurality of keys utilized to encrypt and decrypt the plurality of tape recording media, and each of the plurality of keys is associated with each of a plurality of key IDs.

11. The method of claim 9, wherein when a PKM associated with a specific tape drive provides the first key, the first tape recording medium is associated with a first partition in an inventory information and the first tape recording medium is returned to a storage slot associated with the first partition and the PKM associated with the specific tape drive.

12. The method of claim 9, further comprising:

(k) requesting the first key from a secondary key manager (SKM) associated with the first tape drive if the PKM associated with the first tape drive does not provide the first key, wherein the first tape drive provides the first key ID to the SKM;

(l) determining if the SKM provides the first key corresponding to the first key ID; and (m) storing a second identifying information for the SKM to the memory for the first tape recording medium if the SKM provides the first key.

13. The method of claim 12 further comprising:

(n) repeating steps (k)-(m) for a next SKM associated with the next tape drive if the next PKM associated with the next tape drive does not provide the first key.

14. The method of claim 13 further comprising:

(o) moving the first tape recording medium to a mailslot for removal from the IHS if none of the plurality of PKMs and the plurality of SKMs provide the first key corresponding to the first key ID; and (p) removing the first tape recording medium from an inventory information for the IHS.

15. The method of claim 14, wherein steps (a)-(p) are repeated for each of the plurality of tape recording media in the IHS, and the steps (a)-(p) are automated by the IHS.

* * * * *